United States Patent
Gotoh et al.

(10) Patent No.: US 7,684,299 B2
(45) Date of Patent: Mar. 23, 2010

(54) CONTROL APPARATUS, A CONTROL METHOD AND AN INFORMATION ACCESS APPARATUS

(75) Inventors: Yoshiho Gotoh, Osaka (JP); Yoshihisa Fukushima, Osaka (JP); Tatsushi Bannai, Osaka (JP)

(73) Assignee: Panasonic Corporation, Kadoma (JP)

( * ) Notice: Subject to any disclaimer, the term of this patent is extended or adjusted under 35 U.S.C. 154(b) by 1477 days.

(21) Appl. No.: 11/031,889

(22) Filed: Jan. 7, 2005

(65) Prior Publication Data
US 2005/0160116 A1 Jul. 21, 2005

(30) Foreign Application Priority Data
Jan. 9, 2004 (JP) .............................. 2004-004858

(51) Int. Cl.
*G11B 7/00* (2006.01)
(52) U.S. Cl. ..................................... 369/53.2; 707/200
(58) Field of Classification Search ........................ None
See application file for complete search history.

(56) References Cited
U.S. PATENT DOCUMENTS
7,518,966 B2 * 4/2009 Ishida ........................ 369/53.2

2002/0159369 A1 * 10/2002 Tol et al. .................. 369/59.25
2004/0233798 A1   11/2004 Nakamura et al.
2005/0175317 A1 *  8/2005 Chung et al. .................. 386/52

FOREIGN PATENT DOCUMENTS
JP       2003-168266       6/2003

* cited by examiner

*Primary Examiner*—Joseph H Feild
*Assistant Examiner*—Joseph Haley
(74) *Attorney, Agent, or Firm*—Renner, Otto, Boisselle & Sklar LLP

(57) ABSTRACT

A control apparatus is provided for controlling a drive apparatus to access a rewritable information recording medium using a first file system. The control apparatus includes a first determination means for determining whether or not a matter which is not permitted in a second file system exists on the information recording medium; and a second determination means for determining that there is a possibility that the valid data in the first file system is recorded in a first file system space when it is determined that a matter which is not permitted in the second file system exists on the information recording medium.

13 Claims, 7 Drawing Sheets

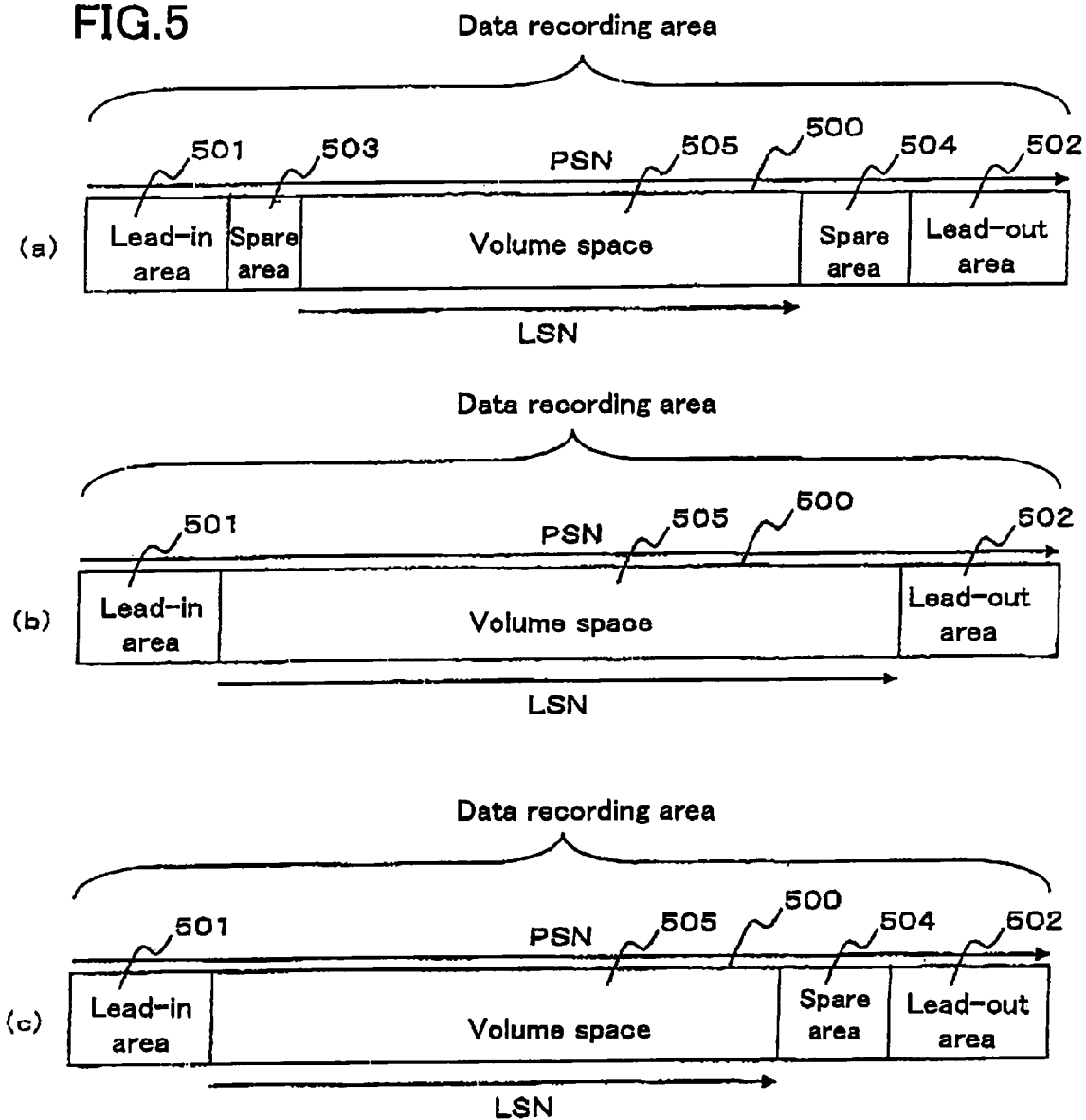

FIG.6

| LSN | Data structure | |
|---|---|---|
| 0 | | |
| | | |
| 16 | Beginning extended area descriptor | ⎫ Volume recognition sequence |
| 17 | NSR descriptor | |
| 18 | Terminating extended area descriptor | ⎭ |
| | | |
| 32 | Primary volume descriptor | ⎫ Volume descriptor sequence |
| 33 | Partition descriptor | |
| 34 | Logical volume descriptor | |
| 35 | Terminating descriptor | ⎭ |
| | | |
| 256 | Anchor volume descriptor pointer | |
| 257 | File set descriptor | ⎫ |
| 258 | File entry (root directory) | |
| 259 | File entry (DATA-A) | |
| 260 | File (DATA-A) | Partition |
| | | |
| | | |
| n−256 | Anchor volume descriptor pointer | ⎭ |
| | | |
| n | Anchor volume descriptor pointer | |

FIG.7

| LSN | |
|---|---|
| 0 | |
| | |
| 16 | Null data |
| 17 | Null data |
| 18 | Null data |
| | |
| 256 | Null data |
| | |
| 512 | Pointing block |
| 513 | Pointing block |
| 514 | Pointing block |
| 515 | Pointing block |
| 516 | Update block |
| 517 | Update block |
| 518 | Update block |
| 519 | Update block |
| 520~523 | |
| 524~527 | |
| 528~531 | |
| | |
| 1024 | |
| | |
| a | File (DATA-A) |
| | |
| n−531 | |
| n−512 | |
| | |
| n−256 | Null data |
| | |
| n | Null data |

- 512–515: Header table
- 516–519: Loop table #1
- 520–523: Loop table #2
- 524–527: Loop table #3
- 528–531: Loop table #4
- 512–531: Start information area
- 1024: Management data for file
- n−531 to n−512: Start information area

US 7,684,299 B2

CONTROL APPARATUS, A CONTROL METHOD AND AN INFORMATION ACCESS APPARATUS

BACKGROUND OF THE INVENTION

1. Field of the Invention

The present invention relates to a control apparatus, a control method and an information access apparatus.

2. Description of the Related Art

Recently, an optical disc for the next generation has been proposed as the techniques for generating a high capacity optical disc develop. Such an optical disc is expected as an optical disc capable of recording high definition video data distributed using digital broadcasting.

An optical disc for recording video data using a dedicated file system for recording digital broadcasting rather than using a general file system in view of the characteristics of a video recorder for the optical disc used for recording digital broadcasting is known. See, for example, Japanese Laid-open patent publication No. 2003-168266 (FIG. 15).

Further, the ECHA167 is known as a general file system. Herein, the ECMA167 is identical to the international standard ISO/IEC13346. See, for example, Standard ECMA-167 3rd Edition—June 1997; ECMA—Standardizing Information and Communication Systems <http:/www.ecma.ch>.

There is a possibility that data is recorded in an optical disc using two different types of file systems in a mixed manner. For example, after data is recorded in an optical disc for the next generation using a dedicated file system for recording digital broadcasting, it may be possible that data is recorded in the optical disc using a general file system which is widely used in the market. Actually, there is a possibility that an optical disc for the next generation may be used in two different matters: one is as an optical disc using a dedicated file system; and the other is as an optical disc using a general file system. In this case, if the two different types of file systems are not correctly identified, a recording/reproduction apparatus may operate erroneously.

For example, when a file for a disc image of an optical disc using a dedicated file system is recorded in the optical disc using a general file system, it is possible that a part of the optical disc which is originally intended to be accessed using, the general file system is actually accessed using the dedicated file system. In this case, it is possible that data is destroyed due to unintended instructions from a user. More specifically, when an area from LSN 512 to LSN (n−512) (LSN: Logical Sector Number, n: the last LSN) is used by the dedicated file system, this area is included in a partition used in the general file system. Therefore, it is permitted in the standard that data is read from the area from LSN 512 to LSN (n−512) of the optical disc in which the data is recorded using the dedicated file system, and this read data is recorded as one file at the same location of another optical disc formatted using the general file system. However, if this optical disc is inserted into an apparatus which does not support only the dedicated file system, the apparatus accesses the optical disc using the dedicated file system. As a result, erroneous operation of the apparatus may occur.

One of the purposes of the present invention is to provide a control apparatus, a control method and an information access apparatus capable of preventing such an unintended erroneous operation.

SUMMARY OF THE INVENTION

According to the present invention, a control apparatus is provided for controlling a drive apparatus to access a rewritable information recording medium using a first file system. The information recording medium has a data recording area in which data can be recorded, a first file system space and a second file system space are defined on the data recording area, the first file system space can be used to record data using a first file system, the second file system space can be used to record data using a second file system which is different from the first file system, and the first file system space is included in the second file system space. The control apparatus includes: a first determination means for determining whether or not a matter which is not permitted in the second file system exists on the information recording medium; and a second determination means for determining that there is a possibility that the valid data in the first file system is recorded in the first file system space when it is determined that a matter which is not permitted in the second file system exists on the information recording medium.

In one embodiment, the matter which is not permitted in the second file system is such that a predetermined data other than data which is permitted in the second file system is recorded in a predetermined first area which is located within the second file system space and is located outside of the first file system space, and the first determination means determines whether or not a matter which is not permitted in the second file system exists on the information recording medium by determining whether or not data read from the predetermined first area agrees with the predetermined data.

In one embodiment, the control apparatus further includes: a reading means for reading data from a predetermined second area which is located within the first file system space when it is determined that the data read from the predetermined first area agrees with the predetermined data; and a third determination means for determining whether or not the data read from the predetermined second area agrees with data which is permitted in the first file system.

In one embodiment, the control apparatus further includes: a processing means for performing a process in accordance with the first file system when it is determined that the data read from the predetermined second area agrees with data which is permitted in the first file system.

In one embodiment, the second determination means determines that the valid data in the first file system is not recorded in the first file system space when it is determined that the data read from the predetermined first area does not agree with the predetermined data.

In one embodiment, the predetermined data is null data.

In one embodiment, the second file system is a file system in accordance with the ECMA167, the predetermined first area is one of an area for recording a first descriptor for a volume recognition and an area for recording an anchor volume descriptor pointer indicating an area in which information for a volume structure is recorded.

In one embodiment, the matter which is not permitted in the second file system is such that a spare area is not previously allocated on the data recording area, and the first determination means determines whether or not a matter which is not permitted in the second file system exists on the information recording medium by determining whether or not the size of the spare area is zero.

In one embodiment, the control apparatus further includes: a reading means for reading data from a predetermined second area which is located within the first file system space when it is determined that a spare area is not previously allocated on the data recording area; and a third determination means for determining whether or not the data read from the predetermined second area agrees with data which is permitted in the first file system.

In one embodiment, the control apparatus further includes: a processing means for performing a process in accordance with the first file system when it is determined that the data read from the predetermined second area agrees with data which is, permitted in the first file system.

In one embodiment, the second determination means determines that the valid data in the first file system is not recorded in the first file system space when it is determined that a spare area is previously allocated on the data recording area.

According to another aspect of the present invention, a control method is provided for controlling a drive apparatus to access a rewritable information recording medium using a first file system. The information recording medium has a data recording area in which data can be recorded, a first file system space and a second file system space are defined on the data recording area, the first file system space can be used to record data using a first file system, the second file system space can be used to record data using a second file system which is different from the first file system, and the first file system space is included in the second file system space. The control method includes the steps of determining whether or not a matter which is not permitted in the second file system exists on the information recording medium; and determining that there is a possibility that the valid data in the first file system is recorded in the first file system space when it is determined that a matter which is not permitted in the second file system exists on the information recording medium.

According to another aspect of the present invention, an information access apparatus is provided. The information access apparatus includes: a drive apparatus for accessing a rewritable information recording medium; and a control apparatus for controlling the drive apparatus to access the rewritable information recording medium using a first file system, wherein the information recording medium has a data recording area in which data can be recorded, a first file system space and a second file system space are defined on the data recording area, the first file system space can be used to record data using a first file system, the second file system space can be used to record data using a second file system which is different from the first file system, and the first file system space is included in the second file system space, and wherein the control apparatus includes: a first determination means for determining whether or not a matter which is not permitted in the second file system exists on the information recording medium; and a second determination means for determining that there is a possibility that the valid data in the first file system is recorded in the first file system space when it is determined that a matter which is not permitted in the second file system exists on the information recording medium.

Thus, the invention described herein makes possible the advantages of providing a control apparatus, a control method and an information access apparatus capable of preventing the erroneous operation of the information access apparatus for accessing the optical disc in a case where there is a possibility that data is recorded in the optical disc using a first file system (e.g. a dedicated file system) and a second file system (e.g. a general file system) in a mixed manner.

These and other advantages of the present invention will become apparent to those skilled in the art upon reading and understanding the following detailed description with reference to the accompanying figures.

BRIEF DESCRIPTION OF THE DRAWINGS

FIG. 5 is a diagram showing a layout of the data recording area of the optical disc.

FIG. 6 is a diagram showing an example of the layout of the volume file structure defined in the ECMA167.

FIG. 7 is a diagram showing an example of the layout of the data structure for a dedicated file system for the purpose of recording digital broadcasting.

DESCRIPTION OF THE PREFERRED EMBODIMENTS

Hereinafter, an embodiment of the present invention will be described with reference to, the drawings.

1. An Optical Disc

An optical disc used in the present invention is a rewritable optical disc. The optical disc has a data recording area in which data can be recorded. A first file system space and a second file system space are previously defined on the data recording area. The first file system space can be used to record data using a first file system. The second file system space can be used to record data using a second file system which is different from the first file system. Further, the first file system space is included in the second file system space (i.e. a part of the second file system space is equivalent to the first file system space).

A BDFS can be used, for example, as the first file system. The BDFS is a dedicated file system suitable for recording digital broadcasting. An area in which data can be recorded using the BDFS (i.e. the first file system space) is defined as an area from a sector of LSN 512 to a sector of LSN (n−512), where n denotes the last LSN. However, the BDFS is merely an example of the first file system. It is not intended that the first file system is limited to the BDFS or any other particular dedicated file system.

A file system in accordance with the ECMA167 Standard can be used, for example, as the second file system. This file system is referred to as a UDF (Universal Disc Format). The UDF is a registered trademark of the Optical Storage Technology Association. The UDF is a general file system which can be widely used without specializing any particular use (e.g. computer use or video use). An area in which data can be recorded using the UDF (i.e. the second file system space) is defined as an area from a sector of LSN 0 to a sector of LSN n (i.e. a volume space), where n denotes the last LSN. However, the UDF is merely an example of the second file system. It is not intended that the second file system be limited to the UDF or any other particular general file system.

A rewritable optical disc is a typical example of a rewritable information recording medium. However, it is not essential that a medium used in the present invention is a disc. Any medium other than the disc can be used. Further, it is not essential that a medium used in the present invention is a medium in which data can be read or written optically. Any medium other than the medium in which data can be read or written optically (e.g. a medium in which data can be read or written magnetically) can be used.

2. A Method for Accessing the Optical Disc

Figure 1:
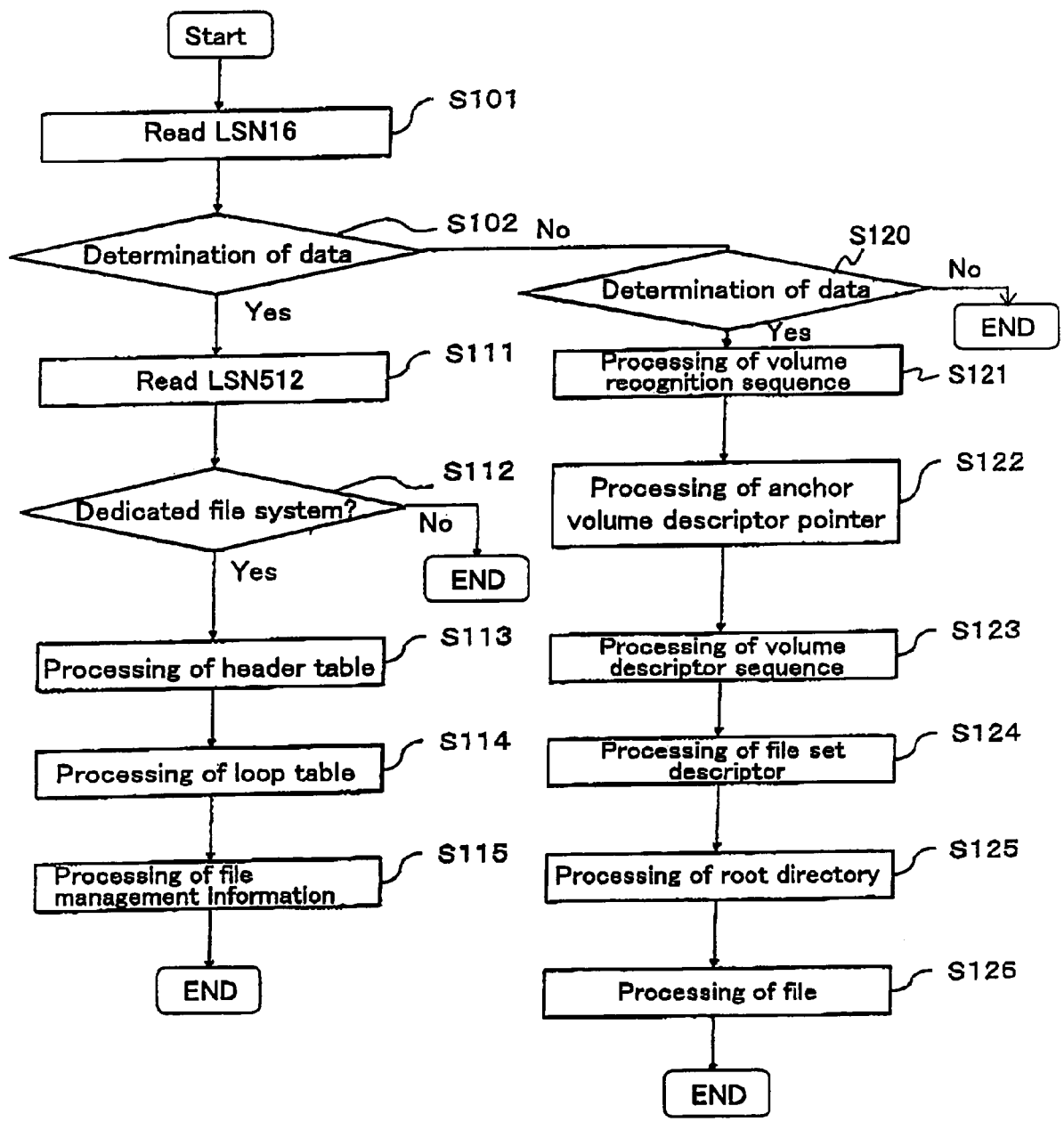
FIG. 1 is a flowchart showing an example of a procedure of a method for accessing the optical disc.

FIG. 1 shows an example of a procedure of a method for accessing the optical disc. Herein, an example in which a BDFS (which is one example of the dedicated file system) is used as the first file system and a UDF (which is one example of the general file system) is used as the second file system will be described.

In step S101, data is read from a sector of LSN 16. The sector of LSN 16 is located outside of an area in which data can be recorded using the BDFS (i.e. the first file system space) and is located within an area in which data can be recorded using the UDF (i.e. the second file system space). The sector of LSN 16 as a top sector of the volume recognition sequence in the ECMA167 Standard.

In step S102, it is determined whether or not the data read from the sector of LSN 16 is null data. The null data is referred to as data having bits, a value of each bit being zero.

The data to be compared with the data read from the sector of LSN 16 in not limited to the null data. Instead of the null data, any data other than data permitted in the UDF (e.g. "FF" data in the hexadecimal notation) can be used. The null data is merely an example of the data other than data permitted in the UDF.

If the determination result in step S102 is "Yes", it is determined that there is a possibility that the valid data in the BDFS is recorded within the first file system space. Then, the processing proceeds to step S111. In steps S111 to S112, it is determined whether or not the valid data in the BDFS is recorded within the first file system space. If the determination result in step S102 is "No", it is determined that the valid data in the BDFS is not recorded within the first file system space. Then, the processing proceeds to step S120. In step S120, it is determined whether or not there is a possibility that the valid data in the UDF is recorded within the second file system space.

In step S111, data is read from a sector of LSN 512. The sector of LSN 512 is located within an area in which data can be recorded using the BDFS (i.e. the first file system space). The sector of LSN 512 is a sector which indicates a read start location in the BDFS.

In step S112, it is determined whether or not the data read from the sector of LSN 512 agrees with a predetermine data permitted in the BDFS (e.g. whether or not the data read from the sector of LSN 512 includes an identification information of the BDFS).

If the determination result in step S112 is "Yes", it is determined that the valid data in the BDFS is recorded within the first file system space. Then, the processing proceeds to step S113. In steps S113 to S115, a process is performed in accordance with the BDFS. If the determination result in step S112 is "No", it is determined that the valid data in the BDFS is not recorded within the first file system space. Then, the processing is terminated.

In step S113, a pointing block in a header table is read, and a loop table number designated by the pointing block which has the largest value of the block counter is obtained.

In step S114, a loop table corresponding to the loop table number obtained in step S113 is read, and a start sector number of a file management information area is obtained from the update block which has the largest value of the block counter.

In step S115, management information for a predetermined file is obtained by accessing the file management information area using the start sector number of a file management information area obtained in step S114.

In step S120, it is determined whether or not the data read from the sector of LSN 16 agrees with a predetermined data permitted in the UDF (e.g. whether or not the data read from the sector of LSN 16 agrees with a top data of the volume recognition sequence in the UDF).

If the determination result in step S120 is "Yes", it is determined that there is a possibility that the valid data in the UDF is recorded within the second file system space. Then, the processing proceeds to step S121. In step S121, it is determined whether or not the valid data in the UDF is recorded within the second file system space. If the determination result in step S120 is "No", it is determined that the valid data in the UDF is not recorded within the second file system space. Then, the processing is terminated.

In step S121, the remaining data of the volume recognition sequence in the UDF is read from the sectors subsequent to the sector LSN 16, and a volume identification information is obtained. If the volume identification information is NSR03, then it is recognized that the valid data in the UDF is recorded within the second file system space.

In step S122, data is read from a sector of LSN 256. As a result, the location information of the volume descriptor sequence recorded in the anchor volume descriptor pointer is obtained.

In step S123, the volume descriptor sequence is read from the location information obtained in step S122, and the location information of a partition and the location information of a file set descriptor are obtained from the partition descriptor and logical volume descriptor recorded in the volume descriptor sequence. A domain identification information, which indicates which specification under the ECMA167 Standard the optical disc is in accordance with, is recorded in the logical volume descriptor. This information can be obtained as information on the specification of the file system.

In step S124, the file set descriptor is read using the location information obtained in step S123. As a result, the location information of a file entry for a root directory is obtained.

In step S125, the file entry for the root directory is read using the location information obtained in Step S124. As a result, the location information of the root directory is obtained from the file entry. The file identification descriptor corresponding to a predetermined file in the root directory is searched by accessing the root directory. As a result, the location information of the file entry for the predetermined file is obtained.

In step S126, the file entry for the predetermined file is read using the location information obtained in step S125. AB a result, the location information of this file is obtained.

As explained in steps S125 and S126, a desired file can be accessed by sequentially tracing the directories and the files. In this flowchart, a detailed procedure for accessing the respective files is omitted.

Thus, data is read from an area (e.g. a sector of LSN 16) which is located outside of an area in which data can be recorded using the BDFS (i.e. the first file system space) and which is located within an area in which data can be recorded using the UDF (i.e. the second file system space), and it is determined whether or not the data read from the area agrees with a predetermined data other than data permitted in the second file system (e.g. null data). As a result, it can be determined whether or not there is a possibility that the valid data in the first file system is recorded within the first file system space. Based on the determination result, it can be determined whether a process is performed in accordance with the first file system or a process is performed in accordance with the second file system. This makes it possible to prevent an apparatus for accessing the optical disc (e.g. a recording/reproduction apparatus for performing recording or reproduction for the optical disc) from operating erroneously.

In the rule of the international standard for the ECMA167, the identification information of a file system is recorded in the form of the volume structure descriptor within the volume recognition sequence recorded in the sector of LSN 16 and the subsequent sectors, so that a type of the file system can be identified. However, in the dedicated file system such as a BDFS, it is difficult to assign the identification information of the file system associated with the ECMA167 because of the dedicated specification of the file system. When the dedicated file system is used, null data is recorded in the sector of LSN 16. Alternatively, instead of the null data, any data (e.g. data "FF" in the hexadecimal notation) which is not permitted in the file system in accordance with the ECMA167 can be recorded in the sector of LSN 16.

The volume identification information, which indicates that the data structure for the general file system such as the UDF is recorded, may be recorded in the second sector of the volume recognition sequence. In this case, it is possible to read data from the sector of LSN 17 instead of the sector of LSN 16 and to determine whether a process is performed in accordance with the dedicated file system or a process is performed in accordance with the general file system, based on the data read from the sector of LSN 17.

The processing in steps S101 and S102 can be interpreted as the processing for the general file system in accordance with the ECMA167. In this case, the processing in steps S120 to S126 can be interpreted as the processing for the general file system, which follows the processing in steps S101 and S102. The difference between the conventional processing for the general file system and the present invention's processing for the general file system is to add a branch to the dedicated file system in a part of the processing for the general file system. Further, for an apparatus which reads data using only the dedicated file system, steps S101 and S102 are added to steps S111 to S115 for the dedicated file system.

In the example shown in FIG. 1, if the determination result in step S102 is "No", the processing of steps S121 to S126 are performed. However, the processing may be terminated without performing the processing of steps S121 to S126. For example, when an apparatus for accessing the optical disc has a capability of performing the processing in accordance with the first file system, but not have any capability of performing any processing in accordance with the second file system, it is effective to terminate the processing without performing the processing of steps S121 to S126. This is because, when there is no possibility that the valid data in the first file system is recorded in the first file system space, it is considered that there is a possibility that the valid data in the second file system is recorded in the first file system space and it is effective to prohibit the apparatus from accessing the first file system space in order to prevent the erroneous operation of the apparatus.

Figure 2:
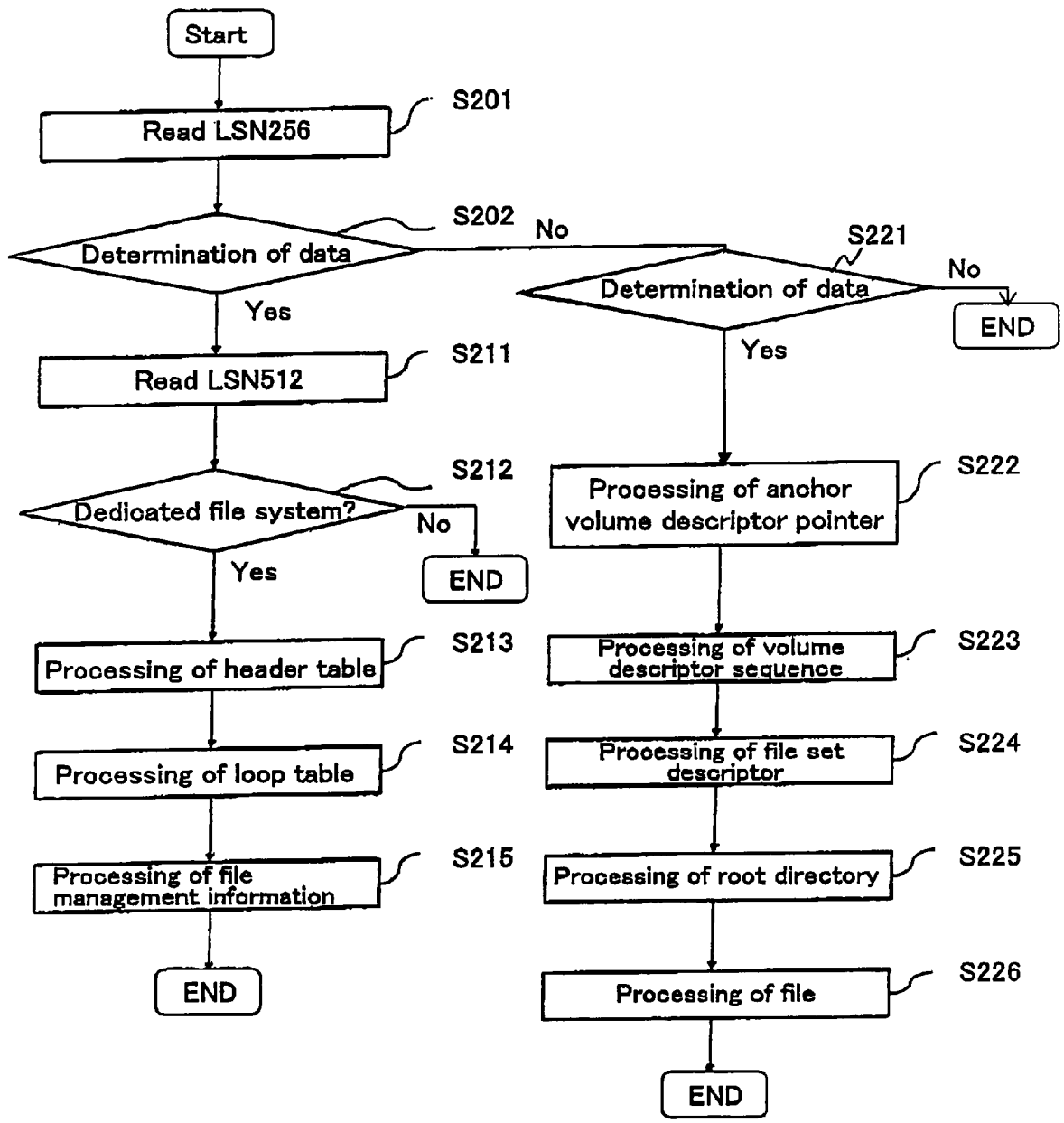
FIG. 2 is a flowchart showing another example of a procedure of a method for accessing the optical disc.

FIG. 2 shows another example of a procedure of a method for accessing the optical disc. The procedure shown in FIG. 2 is intended to reduce the number of accesses to the optical disc by simplifying the processing steps. Herein, an example in which a BDFS (which is one example of the dedicated file system) is used as the first file system and a UDF (which is one example of the general file system) is used as the second file system will be described.

In step S201, data is read from a sector of LSN 256. The sector of LSN 256 is located outside of an area in which data can be recorded using the BDFS (i.e. the first file system space) and is located within an area in which data can be recorded using the UDF (i.e. the second file system space). The sector of LSN 256 is a sector in which an anchor volume descriptor pointer is recorded in the ECMA167 Standard.

In step S202, it is determined whether or not the data read from the sector of LSN 256 is null date. The null data is referred to as data having bits, a value of each bit being zero.

The data to be compared with the data read from the sector of LSN 256 is not limited to the null data. Instead of the null data, any data other than data permitted in the UDF (e.g. "FF" data in the hexadecimal notation) can be used. The null data is merely an example of the data other than data permitted in the UDF.

If the determination result in step S202 is "Yes", it is determined that there is a possibility that the valid data in the BDFS is recorded within the first file system space. Then, the processing proceeds to step S211. In steps S211 to S212, it is determined whether or not the valid data in the BDFS is recorded within the first file system space. If the determination result in step S202 is "No", it is determined that the valid data in the BDFS is not recorded within the first file system space. Then, the processing proceeds to step S221. In step S221, it is determined whether or not the valid data in the UDF is recorded within the second file system space.

In step S221, it is determined whether or not the data read from the sector of LSN 256 agrees with a predetermined data permitted in the UDF (e.g. whether or not the data read is from the sector of LSN 256 agrees with data of the anchor volume descriptor pointer in the UDF).

If the determination result in step S221 is "Yes", it is determined that the valid data in the UDF is recorded within the second file system space. Then, the processing proceeds to step S222. In steps S222 to S226, a process is performed in accordance with the UDF. If the determination result in step S221 is "No", it is determined that the valid data in the UDF is not recorded within the second file system space. Then, the processing is terminated.

The anchor volume descriptor pointer represents information as a descriptor tag. The information is located at the top of the anchor volume descriptor pointer. The information indicates identification information of the descriptor, a version number of the ECMA167, check sum and CRC (Cyclic Redundancy Check). Accordingly, it is possible to determine whether or not the data read from the sector of LSN 256 agrees with the data of the anchor volume descriptor pointer of the UDF based on this information.

The processing steps S211 to S215 are identical to the processing steps S111 to S115 as explained with reference to FIG. 1.

The processing steps S222 to S226 are identical to the processing steps S122 to S126 as explained with reference to FIG. 1.

Thus, in step S202, it is determined whether or not the data read from the sector of LSN 256 is null data, and in step S221, it is determined whether or not the data read from the sector of LSN 256 agrees with the data of the anchor volume descriptor pointer of the UDF. As a result, it can be determined in a simplified manner whether or not the optical disc is one recorded in accordance with the ECMA167. This makes it possible to omit the processing for accessing the sequence recorded in the sector of LSN 16 and the subsequent sectors.

In step S201 of FIG. 2, it is possible to read at least two data from at least two sectors among a sector of LSN 256, a sector of LSN n and a sector of n−256, where n denotes the last LSN.

In this case, in step S202, it is determined whether or not each of the at least two data is null data, and in step S221, it is determined whether or not at least one of the at least two data agrees with the data of the anchor volume descriptor pointer. This is because, in ECMA167, the anchor volume descriptor pointer is recorded in at least two sectors among the sector of LSN 256, the sector of LSN n and the sector of n−256.

Similar to FIG. 1, the processing in steps S201 and S202 can be interpreted as the processing for the general file system in accordance with the ECMA167. In this case, the processing in steps S221 to S226 can be interpreted as the processing for the general file system, which follows the processing in steps S201 and S202. The difference between the conventional processing for the general file system and the present invention's processing for the general file system is to add a branch to the dedicated file system in a part of the processing for the general file system. The branch to the dedicated file system may be performed after processing of the volume recognition sequence. Further, for an apparatus which reads data using only the dedicated file system, stops S201 and S202 are added to steps S211 to S215 for the dedicated file system.

In an example shown in FIG. 2, if the determination result in step S202 is "No", the processing of steps S221 to S226 are performed. However, the processing may be terminated without performing the processing of steps S221 to S226. For example, when an apparatus for accessing the optical disc has a capability of performing the processing in accordance with the first file system, but not have any capability of performing any processing in accordance with the second file system. It is effective to terminate the processing without performing the processing of steps S221 to S226. This is because, when there is no possibility that the valid data in the first file system is recorded in the first file system space, it is considered that there is a possibility that the valid data in the second file system is recorded in the first file system space and it is effective to prohibit the apparatus from accessing the first file system space in order to prevent the erroneous operation of the apparatus.

Figure 3:
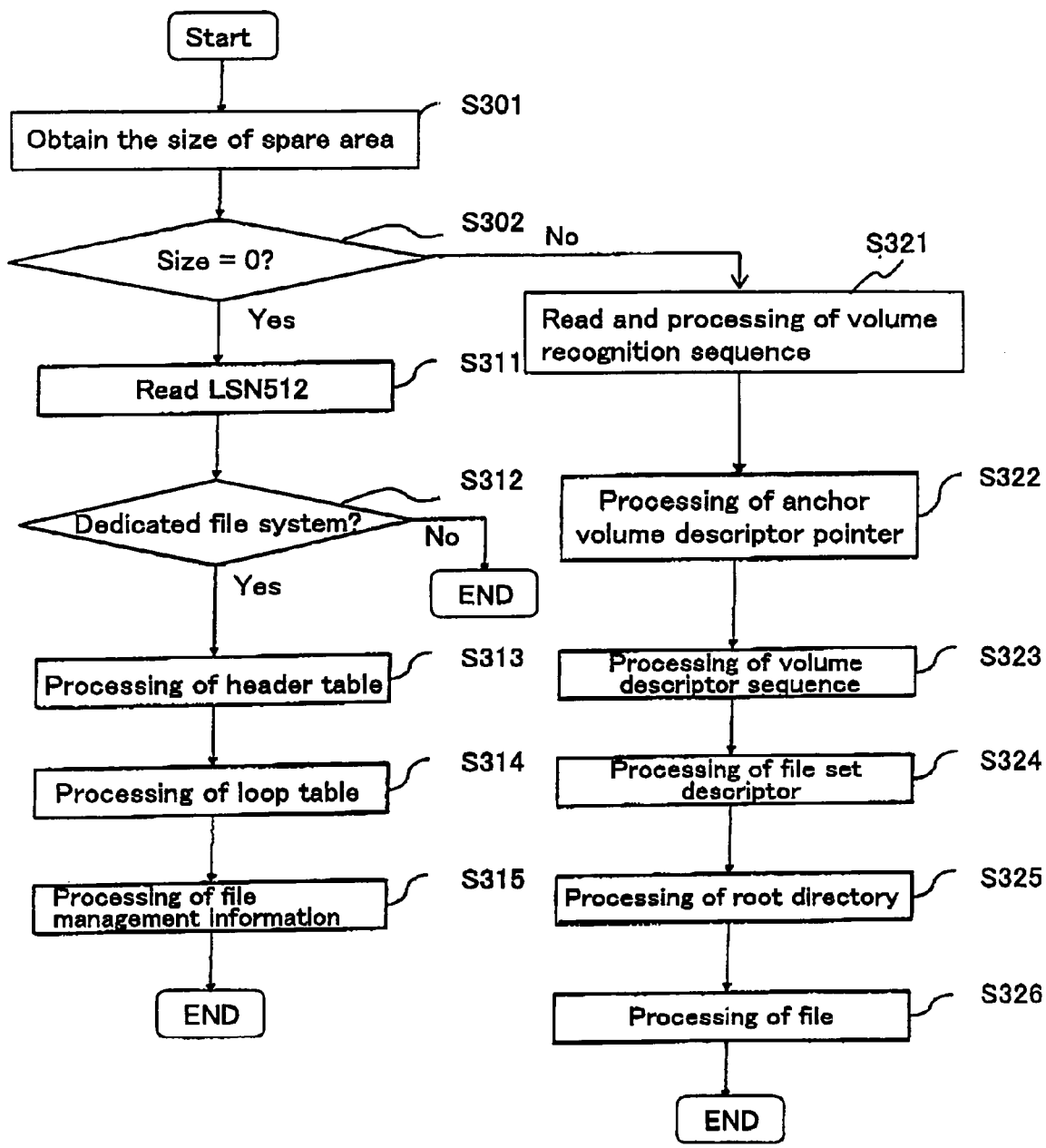
FIG. 3 is a flowchart showing another example of a procedure of a method for accessing the optical disc.

FIG. 3 shows another example of a procedure of a method for accessing the optical disc. The procedure shown in FIG. 3 is intended to utilize the difference in size of a spare area for a defect management mechanism. Herein, an example in which a BDFS (which is one example of the dedicated file system) is used as the first file system and a UDF (which is one example of the general file system) is used as the second file system will be described.

In step S301, the size of the spare area which is set with respect to the optical disc is obtained. The optical is disc with a defect management mechanism has a list for defect management in an area which is not normally accessible by a user. A drive apparatus manages defect sectors to which a linear replacement process has been applied, by recording/reproducing the list for defeat management.

In step S302, it is determined whether or not the size of the spare area obtained in step S301 is zero.

If the determination result in step S302 is "Yes", it is determined that there is a possibility that the valid data in the BDFS is recorded within the first file system space. Then, the processing proceeds to step S311. Insteps S311 to S312, it is determined whether or not the valid data in the BDFS is recorded within the first file system space. If the determination result in step S302 is "No", it is determined that the valid data in the BDFS is not recorded within the first file system space. Then, the processing proceeds to step S321. In step S321, it is determined whether or not there is a possibility that the valid data in the UDF is recorded within the second file system space.

The processing steps S311 to S315 are identical to the processing steps S111 to S115 as explained with reference to FIG. 1.

The processing steps S321 are identical to the processing steps S120 and S121 as explained with reference to FIG. 1.

The processing steps S322 to S326 are identical to the processing steps S122 and S126 as explained with reference to FIG. 1.

Thus, in step S302, it is determined whether or not the size of the spare area which is set with respect to the optical disc is zero. This determination makes it possible to determine whether or not a spare area was previously allocated on the data recording area. Alternatively, it is possible to determine whether or not a spare area was previously allocated on the data recording area by any method other than a method in which it is determined whether or not the size of the spare area which is set with respect to the optical disc is zero.

When the first file system adopts a defeat management mechanism which does not require any spare area and the second file system adopts a defect management mechanism which requires a spare area, it is possible to determine whether a process is performed in accordance with the first file system or a process is performed in accordance with the second file system by determining whether or not a spare area was previously allocated on the data recording area.

In a design for a consumer product, the drive apparatus for the optical disc and its control section may often have a dedicated interface rather than a general interface due to the reduction of cost, and they are controlled via the dedicated interface. Alternatively, there may be a case where a CPU for controlling the drive apparatus is identical to a CPU for controlling a whole system as a recording apparatus. In view of such a design concept for the consumer product, it is not necessary to provide any defect management mechanism on the physical layer of the optical disc. Accordingly, there does not occur any problem if a dedicated file system having a defect management mechanism (i.e. a dedicated file system in which the size of the spare area is zero) is adopted to the optical disc.

On the other hand, in a system constituting general parts such as a personal computer, the drive apparatus for the optical disc and its control section may be connected via a general interface. If the control section determines a defective sector via the general interface and performs a replacement processing, the performance of the system is reduced. In order to avoid this, in a general file system in the general system such as a personal computer, it is necessary to manage defective sectors in the drive apparatus.

Therefore, the determination step S302 is very effective to identify a type of the file system.

By combining the steps described in FIGS. 1 and 2 with the steps described in FIG. 3, it is possible to more securely prevent a consumer product from erroneously operating.

Hereinafter, a common concept of the methods shown in FIGS. 1 to 3 will be described.

Firstly, it is determined whether or not a matter which is not permitted in the second file system exists in the optical disc (a first determination step). This first determination step corresponds to step S102 in FIG. 1, step S202 in FIG. 2 and step S302 in FIG. 3.

In the examples shown in FIGS. 1 and 2, "a matter which is not permitted in the second file system" corresponds to that data other than data which is permitted in the second file system (e.g. null data) and recorded in a sector of LSN 16 (or a sector of LSN 256) of the optical disc.

In the example shown in FIG. 3, "a matter which is not permitted in the second file system" corresponds to any spare area that is not previously allocated on the data recording area of the optical disc.

However, each of the matters shown in FIGS. 1 to 3 is merely an example of "a matter which is not permitted in the second file system". It is not intended that "a matter which is not permitted in the second file system" is limited to the matters shown in FIGS. 1 to 3.

As the result of the determination in the first determination step, if it is determined that a matter which is not permitted in the second file system exists in the optical disc (e.g. if "Yes" in step S102 of FIG. 1, if "Yes" in stop S202 of FIG. 2 or if "Yes" in step S302 of FIG. 3), it is determined that there is a possibility that the valid data in the first file system is recorded in the first file system space (a second determination step). In this case, it is determined whether or not the valid data in the first file system is actually recorded in the first file system space. This makes it possible to confirm that the valid data in the second file system is not recorded in the first file system space. As a result, the erroneous operation of the apparatus for accessing the optical disc can be prevented.

As the result of the determination in the first determination step, if it is determined that a matter which is not permitted in the second file system does not exist in the optical disc (e.g. if "No" in step S102 of FIG. 1, if "No" in step S202 of FIG. 2 or if "No" in step S302 of FIG. 3), it is determined that the valid data in the first file system is not recorded in the first file system space. In this case, the processing is terminated since there is a possibility that the valid data in the second file system is recorded in the first file system space. This makes it possible to prevent access to the first file system space when there is a possibility that the valid data in the second file system is recorded in the first file system space. As a result, the erroneous operation of the apparatus for accessing the optical disc can be prevented.

3. The Structure of the Apparatus for Accessing the Optical Disc

Figure 4:
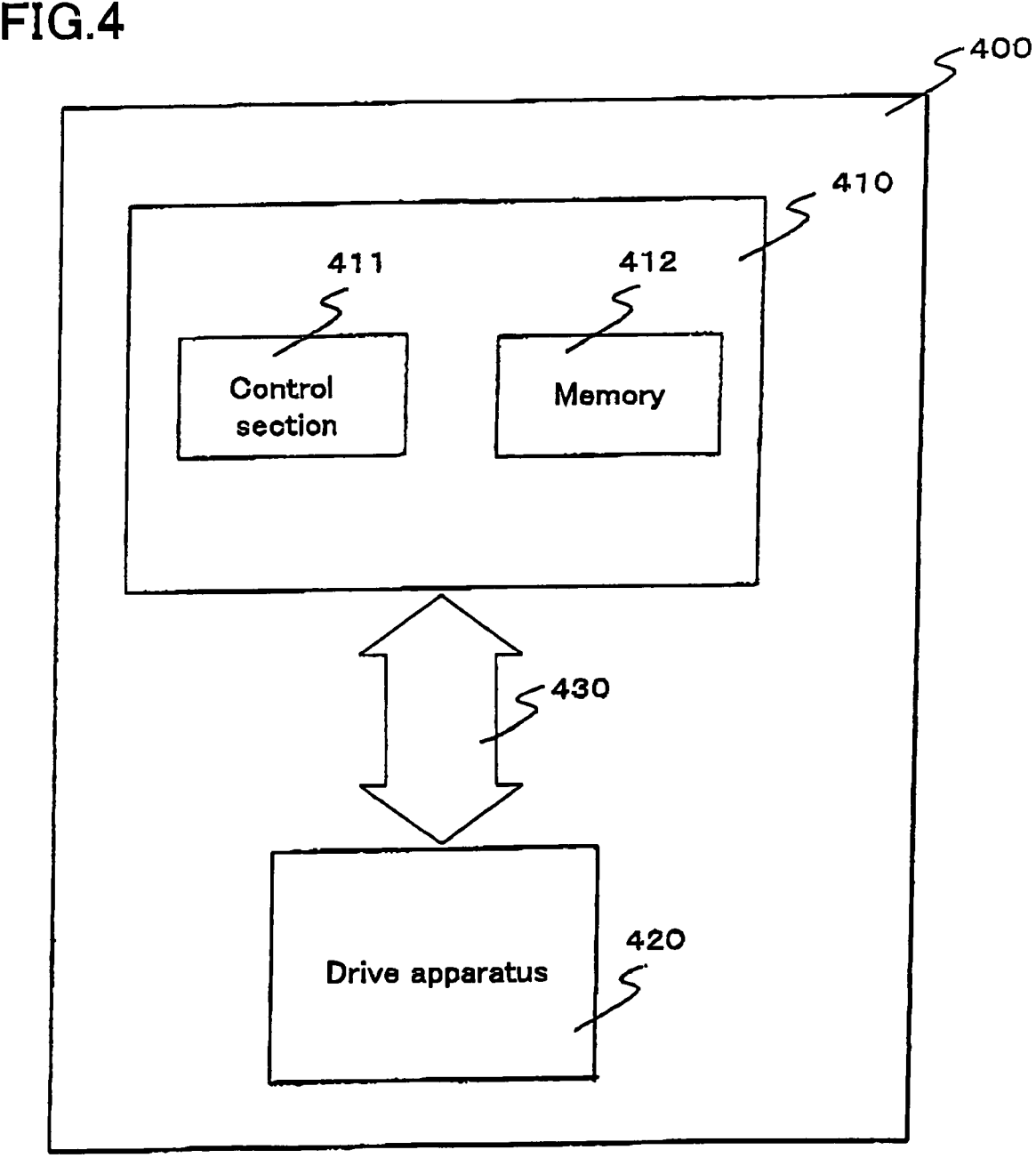
FIG. 4 is a diagram showing an example of the structure of the information access apparatus.

FIG. 4 shows an example of the structure of the information access apparatus 400 for accessing the optical disc mentioned above.

The information access apparatus 400 includes a system control apparatus 410, a drive apparatus 420, and an interface 430 for connecting the system control apparatus 410 with the drive apparatus 420.

The system control apparatus 410 controls the operation of the drive apparatus 420 by outputting a control signal to the drive apparatus 420. The drive apparatus 420 accesses the optical disc in accordance with the control signal output from the system control apparatus 410.

The system control apparatus 410 includes at least a control section 441 and a memory 412. The system control apparatus 410 can be a personal computer, for example. The control section 441 and the memory 412 can be implemented as an integrated circuit which is integrated on a single semiconductor chip. Alternatively, the control section 441 and the memory 412 can be implemented as separate integrated circuits which are integrated on separate semiconductor chips, respectively.

A program implementing the procedure of the method shown in FIG. 1 can be stored in the memory 412. Similarly, a program implementing the procedure of the method shown in FIG. 2 or FIG. 3 can be stored in the memory 412.

The control section 411 can be implemented by a processor such as a CPU (Central Processing Unit), for example. The control section 441 can perform the method shown in FIG. 1 by executing the program stored in the memory 412. Similarly, the control section 441 can perform the method shown in FIG. 2 or FIG. 3 by executing the program stored in the memory 412.

Thus, the system control apparatus 410 functions as a control apparatus having a plurality of means each corresponding to one of the steps of the procedure of the method shown in FIG. 1 (or FIG. 2 or FIG. 3).

4. Data Structure of the File System

The details of the data structure of the file system according to the present invention will be described below.

FIG. 5 shows a layout of the data recording area of the optical disc.

As shown in portion (a) of FIG. 5, a lead-in area 501 is located on the data recording area 500 at the inner side of the optical disc. In a single-layer optical disc, a lead-out area 502 is located at the outer side of the optical disc. In a dual-layer optical disc, a lead-out area 502 is located at the inner side of a layer of the optical disc which to other than a layer of the optical disc at which the lead-in area 501 is located. A physical sector number (PSN) is assigned to each sector from the inner side of the optical disc to the outer side of the optical disc. In the single-layer optical disc, a spare area 503 can be set after the lead-in area 501 and a spare area 504 can be set before the lead-out area 502. In the dual-layer optical disc, a spare area can be set at the outer side of the optical disc. A volume space is defined as an area 505 between the spare area 503 and the spare area 504. A logical sector number (LSN) is assigned to each sector within the volume space.

The size of the spare area of the optical disc can be changed when the optical disc is physically formatted. When the size of the spare area is set to zero, the spare area 503 and the spare area 504 are not located as shown in portion (b) of FIG. 5. Alternatively, it 18 possible to locate only the spare area 504 as shown in portion (c) of FIG. 5.

The spare area is an area required for performing a defect management using a linear replacement algorithm by the drive apparatus 420. In order to perform a defect management using a linear replacement algorithm, it is necessary to previously allocate a spare area having a predetermined size on the data recording area 500 of the optical disc. If the spare area is previously allocated on the data recording area 500 of the optical disc, the capacity of the optical disc which can be used by a user is reduced. However, since the drive apparatus 420 can continue the recording operation even if a defective sector is detected, the system control apparatus 410 has a merit that it can handle the optical disc as a logical information recording medium which does not have any defective sector. Because of this, the defect management using the linear replacement algorithm is suitable for a case where the optical disc is handled in a personal computer environment.

On the other hand, when the size of the spare area is set to zero, if a defective sector is detected while recording data, the system control apparatus 410 requires the performing of processing such as the recording of the data at a location other than the defective sector. However, the system control apparatus 410 has a merit that it can effectively use the data recording area 500 of the optical disc due to the absence of the spare area. Because of this, such a format is suitable for a dedicated system such as a consumer product.

The size of the spare area is recorded in the lead-in area 501 or the lead-out area 502. The drive apparatus 410 can recognize a relationship between a starting address of the logical sector number and the physical sector number by recognizing the size of the spare area while loading the optical disc. Since the defect management is performed by the drive apparatus 420, the size of the spare area can be recorded within a defect management list.

FIG. 6 shows an example of the layout of the volume file structure defined in the ECMA167.

An area starting from LSN 16 is an area for a volume recognition sequence. In the international standards such as ECMA and ISO, there is a rule that identification information for the volume structure should be recorded in the volume recognition sequence in order to indicate which standard the optical disc is formatted in accordance with. In this example, a beginning extended area descriptor, an NSR descriptor and a terminating extended area descriptor are recorded in the sector of LSN 16, the sector of LSN 17 and the sector of LSN 18, as the volume recognition sequence, respectively.

Herein, the NSR descriptor is a descriptor including a character string of NSR03 and indicating that a volume structure in accordance with the ECNA167 Standard is recorded.

An anchor volume descriptor pointer is recorded in the sector of LSN 256, the sector of n and the sector of (n−256), where n denotes the last LSN. The anchor volume descriptor pointer includes location information of the volume descriptor sequence in which a volume information is recorded.

In the ECMA167 Standard, an anchor volume descriptor pointer is recorded in at least two sectors among the sector of LSN 256, the sector of n and the sector of (n−256). Data is read from one of the sector of LSN 256, the sector of n and the sector of (n−256). If the anchor volume descriptor pointer is found in the read data, the volume information of the ECMA167 can be accessed.

An area starting from LSN 32 is an area for a volume descriptor sequence. A primary volume descriptor, a partition descriptor, a logical volume descriptor and a terminating descriptor are recorded in the volume descriptor sequence. The primary volume descriptor is mainly used for a multi-volume and it includes primary information of the volume structure. The partition descriptor includes location information of a partition. The logical volume descriptor includes an address of a file set descriptor as information for accessing the file structure. The terminating descriptor indicates that the valid information recorded in the volume descriptor sequence is terminated at this descriptor.

In this example, the partition is set to an area from LSN 257 to LSN (n−257). A logical block number (LBN) is assigned to each sector within the partition, although the LBN is not shown in FIG. 6. The information of the file structure recorded in the partition is designated using the LBN.

A file set descriptor is recorded in a sector of LSN 257 (i.e. area of LBN 0). The file set descriptor includes location information of a file entry for the root directory.

A file entry for the root directory is recorded in a sector of LSN 258 (i.e. an area of LBN 1). In this example, the size of the root directory is small, and the root directory is recorded in the file entry. A file entry for DATA-A recorded under the root directory is recorded in a sector of LSN 259 (i.e. an area of LBN 2). A file for DATA-A is recorded in a sector of LSN 260 (i.e. an area of LBN 3).

Since there is no provision regarding defect management in the ECMA167 Standard, a file system in accordance with the ECMA167 Standard assumes that the drive apparatus 420 performs a defeat management. Therefore, when a rewritable optical disc is logically formatted using a volume file structure in accordance with the ECMA167, it is necessary to previously set a spare area to the rewritable optical disc.

FIG. 7 shows an example of the layout of the data structure for a dedicated file system for the purpose of recording digital broadcasting.

The null data (i.e. data having all zero value) is recorded in a sector of LSN 16, a sector of LSN 17 and a sector of LSN 18. The present invention provides a method for identifying two data structures using the difference in layout between the data structure formatted in accordance with the ECMA167 and the data structure for a dedicated file system. In the conventional international standard, there is a rule that identification information of the volume structure (i.e. an identifier of the format) should be recorded in an area starting from LSN 16. However, the dedicated file system does not follow this rule. Accordingly, the difference between the logical formats cannot be identified according to the conventional volume identification method. Furthermore, the null data is recorded in a sector of LSN 256, a sector of LSN (n−256) and a sector of LSN n.

An area from LSN 512 to LSN 531 is a start information area. In this example, one header table and four loop tables #1, #2, #3 and #4 are successively set in the start information area. The header table includes four sectors of LSN 512, LSN 513, LSN 514 and LSN 515. Each of the four sectors constitutes a pointing block. In view of the repetitive recording characteristics of the sectors, data for the pointing block is sequentially and repeatedly recorded and updated in the sectors in the order of LSN 512, LSN 513, LSN 514 and LSN 515 in order to reduce the recording number of the sectors.

A block counter and an effective number of the loop table are recorded in each pointing block. The value of the block counter is incremented by one each time the data of the pointing block is recorded and updated. The most recently updated pointing block can be identified by finding out a pointing block which has the maximum value of the block counter. In this example, each loop table includes four sectors. Each of the four sectors constitutes an update block.

Similar to the data for the pointing block, data for the update block is sequentially and repeatedly recorded and updated in the sectors in the order of LSNs. In an example of the loop table #1, the data for the update block is sequentially and repeatedly recorded and updated in the sectors in the order of LSN 516, LSN 517, LSN 518 and LSN 519.

A block counter and location information of an area for recording management data for a file are recorded in each update block. The value of the block counter of the update block is incremented by one each time the data of the update block is recorded and updated. The most recently updated update block can be identified by finding out an update block which has the maximum value of the block counter.

Information identifying a dedicated file system, for example, identification characters such as "SPECIFIC_FS", can be recorded in the pointing block and the update block. When data is read from an area starting from LSN 512, if characters "SPECIFIC_FS" can be found in the read data, it can be recognized that the optical disc is formatted using the dedicated file system.

In order to further improve the reliability of the data, the start information area is provided in an area from LSN (n−531) to LSN (n−512). Thus, the location information of the area for recording management data for a file is recorded in two locations.

The management data for a file and the file itself are recorded between the two start information areas. In this example, the management data for a file is recorded in an area starting from LSN 1024 and a file DATA-A is recorded in a sector of LSN a.

In the ECMA167, the data of the file structure is configured such that the management information for each file can be recorded in any location of the optical disc on a sector-by-sector basis. In a dedicated file system, a file name and the location information of a file are given by a table format, and the size of the management data for a file is smaller than that of the management data in the ECMA167. Accordingly, the management information for a file is recorded in a predetermined area.

The reason why the data structure recorded in the start information area is hieratically designed is for performing defect management in view of the physical rewritable characteristics of the sectors. In a case where it becomes impossible to rewrite data in the sector due to physical fatigue of the sector by increasing the number of rewriting the update block in the loop table, the data is recorded in a new loop table and the pointing block in the header table is updated in order to make the new loop table valid. If it becomes impossible to read a pointer to the management data for a file, any user data cannot be read. Therefore, the pointer to the management data for a file is very important data. Because of this, for an information recording medium which does not support any defect management function in the drive apparatus (e.g. an information recording medium in which a spare area is not set), it is necessary to adopt such a hierarchical data structure in order to improve the reliability of the data. On the other hand, for an information recording medium which does support a defeat management function in the drive apparatus, it is not necessary to adopt such a hierarchical data structure. This is because, if a defeat is detected, data can be recorded in a spare area which is previously set. Thus, two types of data structures are based on the different ideas of the defective management. The method for determining which file system is used depending on the size of the spare area according to the present invention is effective for these two types of data structures.

In order to simplify the description, an example in which each of the pointing block and the update block are recorded in one sector is described above. However, when the physical recording unit of the data is an ECC block, each of the pointing block and the update block can be recorded in one ECC block.

The number of sectors in the header table and the loop table is not limited to four. The number of loop tables is not limited to four. These numbers can be determined in view of the physical characteristics regarding the repetitive recording of the information recording medium used.

The present invention is not limited to a rewritable information recording medium. The present invention can be applied to a write at once information recording medium or a reproduction only information recording medium, thereby causing the same effect as the present invention.

When the optical disc is logically formatted using a dedicated file system, a predetermined identification information which is different from the data structure defined in the ECMA167 can be recorded in the volume recognition sequence. For example, a specific descriptor indicating a dedicated file system can be recorded in a sector of LSN 16. In this case, data is read from the sector of LSN 16. If the specific descriptor is included in the read data, then it is recognized that the optical disc is formatted using the dedicated file system.

The method explained with reference to FIG. 1 or 2 can be combined with the method explained with reference to FIG. 3. This enables identifying an optical disc which does not have any normal patterns, such as an optical disc formatted in the ECMA167 without setting any spare area and an optical disc formatted in the dedicated file system with setting a spare area.

As described in a problem to be solved by the present invention, an area which can be used in a dedicated file system explained with reference to FIG. 7 is an area from LSN 512 to LSN (n−512). This area is an area within the partition which can be used in the ECMA167 as explained with reference to FIG. 6. Accordingly, it is possible to read data from an area from LSN 512 to LSN (n−512) of the optical disc formatted in the dedicated file system and to record the data as one file in the same location (i.e. an area from LSN 512 to LSN (n−512)) of the other optical disc formatted in the general file system according to the ECMA167. However, when the optical disc is inserted to a consumer product which supports only a dedicated file system, the optical disc is accessed using the dedicated file system. There is a possibility of causing unintended erroneous operation. In the present invention, prior to accessing the optical disc using the dedicated file system, it is determined whether or not there is a possibility that the data structure in accordance with the ECMA167 is recorded. As a result, such an erroneous operation in reproducing the optical disc can be avoided.

The present invention is useful in providing a control apparatus, a control method and an information access apparatus and etc. capable of preventing the erroneous operation of the information access apparatus for accessing the optical disc in a case where there is a possibility that data is recorded in the optical disc using a first file system (e.g. a dedicated file system) and a second file system (e.g. a general file system) in a mixed manner.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A control apparatus for controlling a drive apparatus to access a rewritable information recording medium using a first file system,
wherein the information recording medium has a data recording area in which data can be recorded, a first file system space and a second file system space are defined on the data recording area, the first file system space can be used to record data using a first file system, the second file system space can be used to record data using a second file system which is different from the first file system, and the first file system space is included in the second file system space,
the control apparatus comprising:
a first determination means for determining whether or not a matter which is not permitted in the second file system exists on the information recording medium; and
a second determination means for determining that there is a possibility that the valid data in the first file system is recorded in the first file system space when it is determined that a matter which is not permitted in the second file system exists on the information recording medium.

2. A control apparatus according to claim 1, wherein the matter which is not permitted in the second file system is such that a predetermined data other than data which is permitted in the second file system is recorded in a predetermined first area which is located within the second file system space and is located outside of the first file system space, and
the first determination means determines whether or not a matter which is not permitted in the second file system exists on the information recording medium by determining whether or not data read from the predetermined first area agrees with the predetermined data.

3. A control apparatus according to claim 2, further comprising:
a reading means for reading data from a predetermined second area which is located within the first file system space when it is determined that the data read from the predetermined first area agrees with the predetermined data; and
a third determination means for determining whether or not the data read from the predetermined second area agrees with data which is permitted in the first file system.

4. A control apparatus according to claim 3, further comprising:
a processing means for performing a process in accordance with the first file system when it is determined that the data read from the predetermined second area agrees with data which is permitted in the first file system.

5. A control apparatus according to claim 2, wherein the second determination means determines that the valid data in the first file system is not recorded in the first file system space when it is determined that the data read from the predetermined first area does not agree with the predetermined data.

6. A control apparatus according to claim 2, wherein the predetermined data is null data.

7. A control apparatus according to claim 2, wherein the second file system is a file system in accordance with the ECMA167, the predetermined first area is one of an area for recording a first descriptor for a volume recognition and an area for recording an anchor volume descriptor pointer indicating an area in which information for a volume structure is recorded.

8. A control apparatus according to claim 1, wherein the matter which is not permitted in the second file system is such that a spare area is not previously allocated on the data recording area, and
the first determination means determines whether or not a matter which is not permitted in the second file system exists on the information recording medium by determining whether or not the size of the spare area is zero.

9. A control apparatus according to claim 8, further comprising:
a reading means for reading data from a predetermined second area which is located within the first file system space when it is determined that a spare area is not previously allocated on the data recording area; and
a third determination means for determining whether or not the data read from the predetermined second area agrees with data which is permitted in the first file system.

10. A control apparatus according to claim 9, further comprising:
a processing means for performing a process in accordance with the first file system when it is determined that the data read from the predetermined second area agrees with data which is permitted in the first file system.

11. A control apparatus according to claim 8, wherein the second determination means determines that the valid data in the first file system is not recorded in the first file system space when it is determined that a spare area is previously allocated on the data recording area.

12. A control method for controlling a drive apparatus to access a rewritable information recording medium using a first file system,
wherein the information recording medium has a data recording area in which data can be recorded, a first file system space and a second file system space are defined on the data recording area, the first file system space can be used to record data using a first file system, the second file system space can be used to record data using a second file system which is different from the first file system, and the first file system space is included in the second file system space,
the control method comprising the steps of:
determining whether or not a matter which is not permitted in the second file system exists on the information recording medium; and
determining that there is a possibility that the valid data in the first file system is recorded in the first file system space when it is determined that a matter which is not permitted in the second file system exists on the information recording medium.

13. An information access apparatus comprising:
a drive apparatus for accessing a rewritable information recording medium; and
a control apparatus for controlling the drive apparatus to access the rewritable information recording medium using a first file system,
wherein the information recording medium has a data recording area in which data can be recorded, a first file system space and a second file system space are defined on the data recording area, the first file system space can be used to record data using a first file system, the second file system space can be used to record data using a second file system which is different from the first file system, and the first file system space is included in the second file system space, and
wherein the control apparatus comprises:
a first determination means for determining whether or not a matter which is not permitted in the second file system exists on the information recording medium; and
a second determination means for determining that there is a possibility that the valid data in the first file system is recorded in the first file system space when it is determined that a matter which is not permitted in the second file system exists on the information recording medium.

* * * * *